(12) United States Patent
Smed et al.

(10) Patent No.: US 7,231,817 B2
(45) Date of Patent: Jun. 19, 2007

(54) INSPECTION SYSTEM FOR A TURBINE BLADE REGION OF A TURBINE ENGINE

(75) Inventors: Jan P. Smed, Winter Springs, FL (US); Dennis H. Lemieux, Casselberry, FL (US); James P. Williams, Orlando, FL (US)

(73) Assignee: Siemens Power Generation, Inc., Orlando, FL (US)

( * ) Notice: Subject to any disclaimer, the term of this patent is extended or adjusted under 35 U.S.C. 154(b) by 20 days.

(21) Appl. No.: 11/036,993

(22) Filed: Jan. 18, 2005

(65) Prior Publication Data

US 2007/0107504 A1    May 17, 2007

(51) Int. Cl.
  *G01L 3/26* (2006.01)
  *G01L 5/13* (2006.01)
  *G01M 15/00* (2006.01)
(52) U.S. Cl. ......................................... 73/116
(58) Field of Classification Search ................... 73/116; 60/772
  See application file for complete search history.

(56) References Cited

U.S. PATENT DOCUMENTS

| | | | |
|---|---|---|---|
| 3,778,170 A | 12/1973 | Howell et al. | |
| 3,841,764 A | 10/1974 | Snell et al. | |
| 4,011,017 A | 3/1977 | Feuerstein et al. | |
| 4,078,864 A | 3/1978 | Howell | |
| 4,153,372 A | 5/1979 | Nauta | |
| 4,298,312 A | 11/1981 | MacKenzie et al. | |
| 4,306,835 A * | 12/1981 | Hurley | 415/118 |
| 4,326,804 A | 4/1982 | Mossey | |
| 4,659,221 A | 4/1987 | Kellie et al. | |
| 4,784,463 A | 11/1988 | Miyazaki | |
| 5,102,221 A | 4/1992 | Desgranges et al. | |
| 5,185,996 A | 2/1993 | Smith et al. | |
| 5,557,099 A * | 9/1996 | Zielinski et al. | 250/227.11 |
| 5,644,394 A | 7/1997 | Owens | |
| 5,803,680 A | 9/1998 | Diener | |
| 5,867,976 A | 2/1999 | Ziegler, Jr. | |
| 6,490,868 B1 | 12/2002 | Bunce et al. | |

* cited by examiner

*Primary Examiner*—Michael Cygan
*Assistant Examiner*—O. Davis

(57) ABSTRACT

An inspection system formed at least from a viewing tube for inspecting aspects of a turbine engine during operation of the turbine engine. An outer housing of the viewing tube may be positioned within a turbine engine using at least one bearing configured to fit into an indentation of a support housing to form a ball and socket joint enabling the viewing tube to move during operation as a result of vibrations and other movements. The viewing tube may also include one or more lenses positioned within the viewing tube for viewing the turbine components. The lenses may be kept free of contamination by maintaining a higher pressure in the viewing tube than a pressure outside of the viewing tube and enabling gases to pass through an aperture in a cap at a viewing end of the viewing tube.

19 Claims, 3 Drawing Sheets

INSPECTION SYSTEM FOR A TURBINE BLADE REGION OF A TURBINE ENGINE

STATEMENT REGARDING FEDERALLY SPONSORED RESEARCH

The U.S. government has a paid-up license in this invention and the right in limited circumstances to require the patent owner to license others on reasonable terms as provided for by the terms of Contract No. DE-FC26-01NT41232 awarded by the Department of Energy

FIELD OF THE INVENTION

This invention is directed generally to turbine engines, and more particularly to inspection systems of turbine blade assemblies in turbine engines.

BACKGROUND

Typically, gas turbine engines include a compressor for compressing air, a combustor for mixing the compressed air with fuel and igniting the mixture, and a turbine blade assembly for producing power. Combustors often operate at high temperatures that may exceed 2,500 degrees Fahrenheit. Typical turbine combustor configurations expose turbine blade assemblies to these high temperatures. As a result, turbine blades must be made of materials capable of withstanding such high temperatures.

Because of the high temperatures to which turbine blades are often exposed, systems have been developed to monitor various components of a turbine engine during testing to determine the feasibility of the components and operation phenomena. One such system that has been developed is a viewing tube that enables a user to view the internal aspects of a turbine engine while the turbine engine is operating. Most of these systems were designed for temporary use, such as during testing procedures, and have not been designed to account for the stresses and wear attributable to long-term exposure to high temperature combustor gases. While these systems have provided various devices for viewing portions of a turbine engine, there exists a need for a robust viewing tube enabling a user to view high temperature components of a turbine engine while the turbine engine is operating at full speed.

SUMMARY OF THE INVENTION

This invention relates to an inspection system formed from at least one viewing tube for viewing components of a turbine engine during operation of a turbine engine. For example, the viewing tube may extend between an outer turbine cylinder and a blade ring enabling a turbine blade assembly, and more particularly, a turbine blade, to be viewed. The viewing tube of the inspection system may be formed from at least one receiver coupled to a component of a turbine engine proximate to a turbine blade assembly and at least one support housing coupled to an outer surface of an outer turbine cylinder. In at least one embodiment, the component the receiver is coupled to is a blade ring. The inspection system may also include at least one generally elongated outer housing extending at least from the support housing coupled to an outer surface of an outer turbine cylinder through the at least one receiver coupled to a component of a turbine engine. The outer housing may be biased towards the at least one receiver to seal the outer housing to the receiver. The outer housing may be supported with a bearing, which may be a spherical hollow bearing, that is coupled to an outer surface of the outer housing and bears against an inner surface of the support housing enabling axial movement of the housing. The bearing may be seated in an indentation, which may be a semi-toroidal indentation, in the inner surface of the support housing. The bearing can form a ball and socket type connection enabling the viewing tube to move relative to the turbine engine components to which the viewing tube is attached, thereby reducing the stresses imparted by the turbine engine on the viewing tube during operation of the turbine engine.

The viewing tube may also include an inner housing positioned within the outer housing and biased toward the receiver. In at least one embodiment, the inner housing is generally cylindrical and positioned concentrically within the outer housing. The inner housing may contain a plurality of optical lenses. The optical lenses may be positioned at various locations depending on the application. The optical lenses may be infrared lenses or other appropriate lenses. In at least one embodiment, the optical lenses may be positioned within an optical lens housing positioned within the inner housing. The optical lens housing may facilitate easy removal, maintenance, and replacement of the lenses, if necessary. More specifically, the inner housing and outer housing are often difficult to remove from an installed position in a turbine engine after the turbine engine has been run as the housings often have tight tolerances and interference fits with adjacent components. However, the optical lens housing may be easily removed and thus, may enable the lenses to be easily maintained.

The inspection system may also include a substantially sealed end at the end of the viewing tube proximate to the receiver. The sealed end may include an aperture enabling components of a turbine engine to be viewed. In addition, the aperture provides a gas pathway between internal aspects of the viewing tube and outside of the viewing tube. The viewing tube may also have a pressure gradient relative to areas outside of the viewing tube such that a higher pressure exists within internal aspects of viewing tube than outside the viewing tube. During operation, gases, which may be cooling air, flow from within the viewing tube out of the aperture in the sealed end proximate the receiver. This gas flow substantially prevents contaminants from entering the viewing tube and harming the optical lenses container therein.

The inspection system may also include a retention tab positioned proximate to the end of the outer housing to which the outer housing is attached to the receiver for preventing the outer housing or other turbine components from moving in contact with a turbine blade during a failure condition. In at least one embodiment, the retention tab may extend from a ring segment of a turbine engine.

An advantage of the inspection system is that the bearing forming the ball and socket type connection between the outer housing and the support housing shields the outer housing and optical lenses contained therein from harmful stresses developed within a turbine engine during operation. The bearing enables the viewing tube to swivel around the pivot point at the bearing relative to the turbine engine.

Another advantage of this invention is the aperture in the sealed end proximate the receiver enables gases at a higher pressure contained within the outer housing to bleed out of the inspection system and thereby prevent contamination of the optical lenses contained therein from foreign materials.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF THE INVENTION

Figure 1:
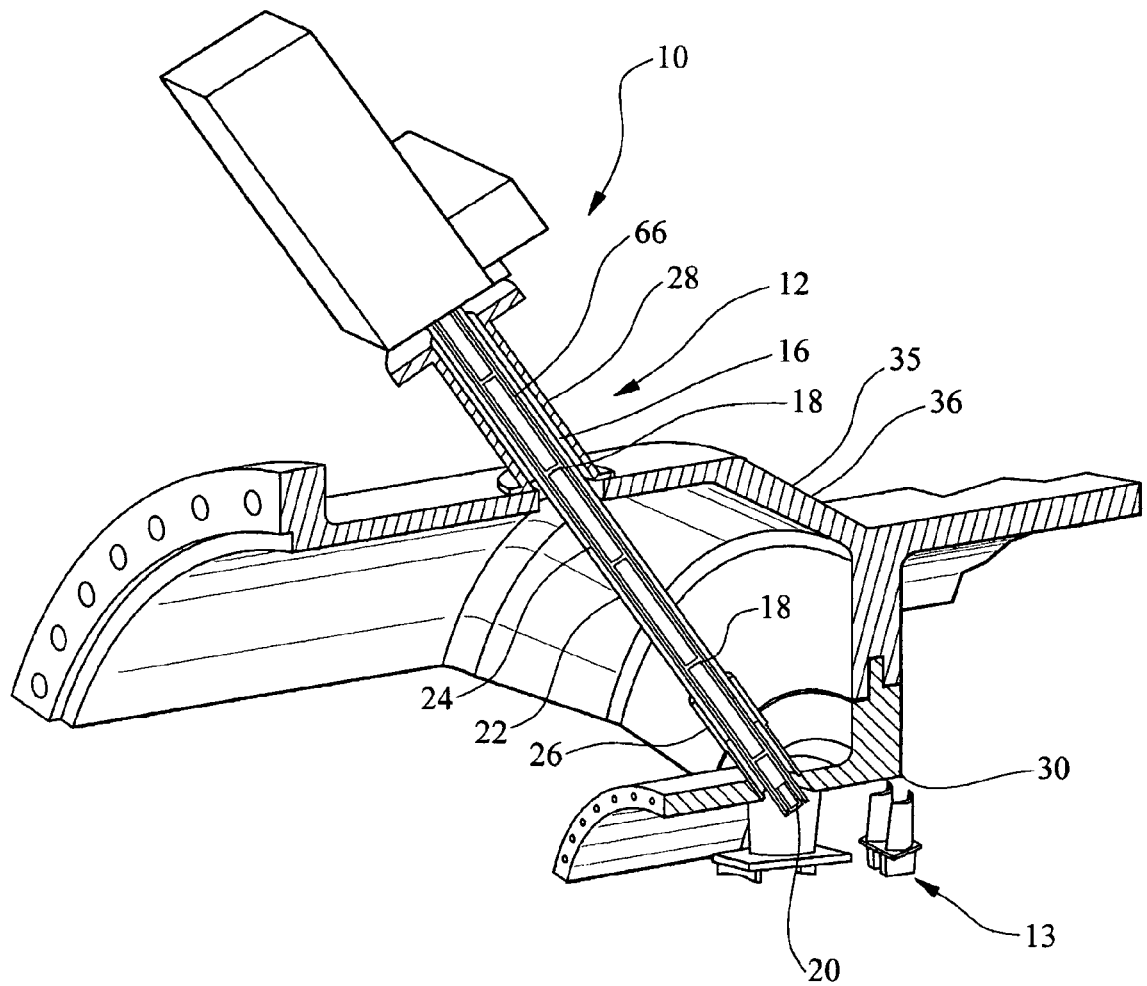
FIG. 1 is a cross-sectional perspective view of a inspection system of the instant invention installed in a turbine engine.
Figure 2:
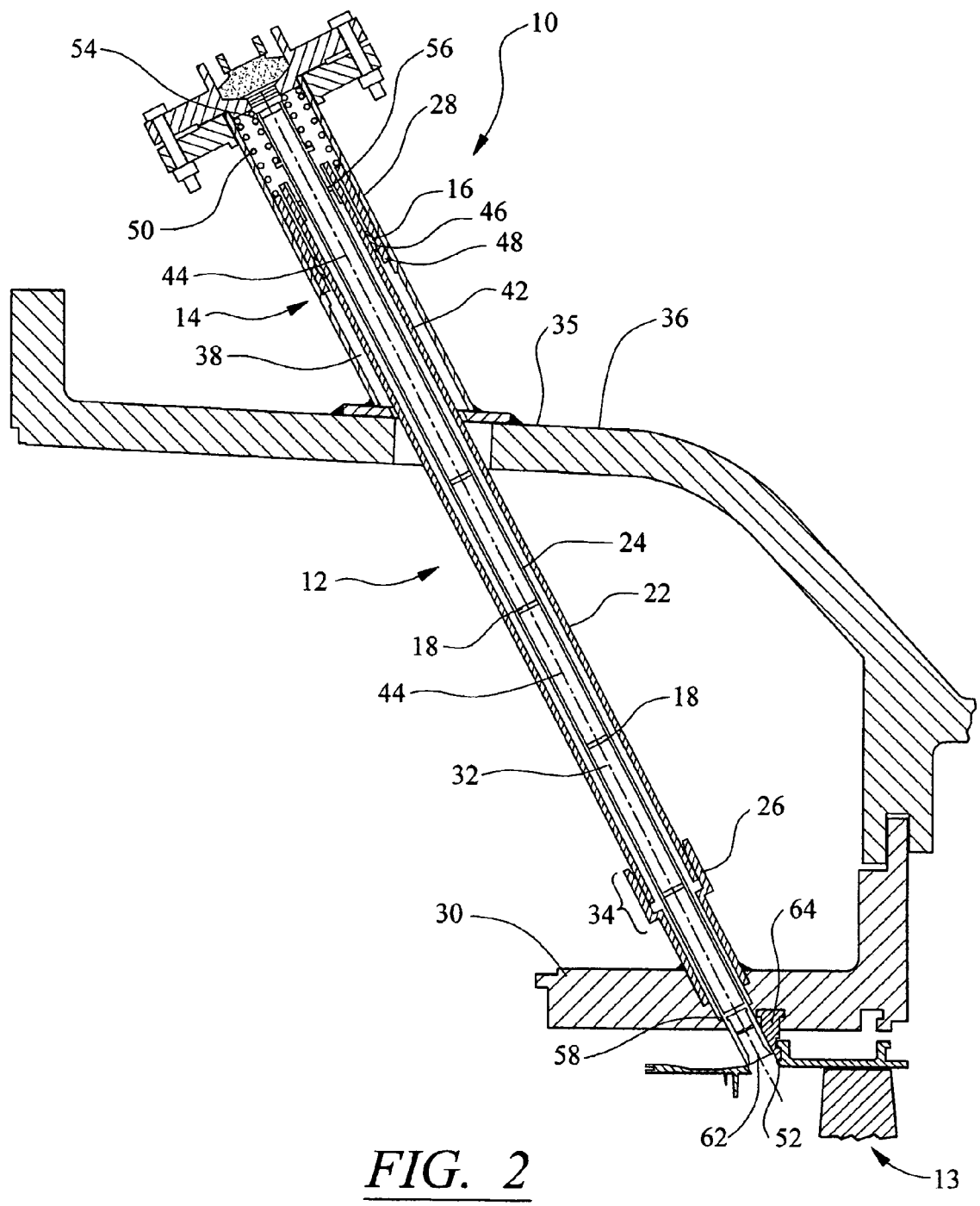
FIG. 2 is a cross-sectional view of the inspection system shown in FIG. 1.
Figure 3:
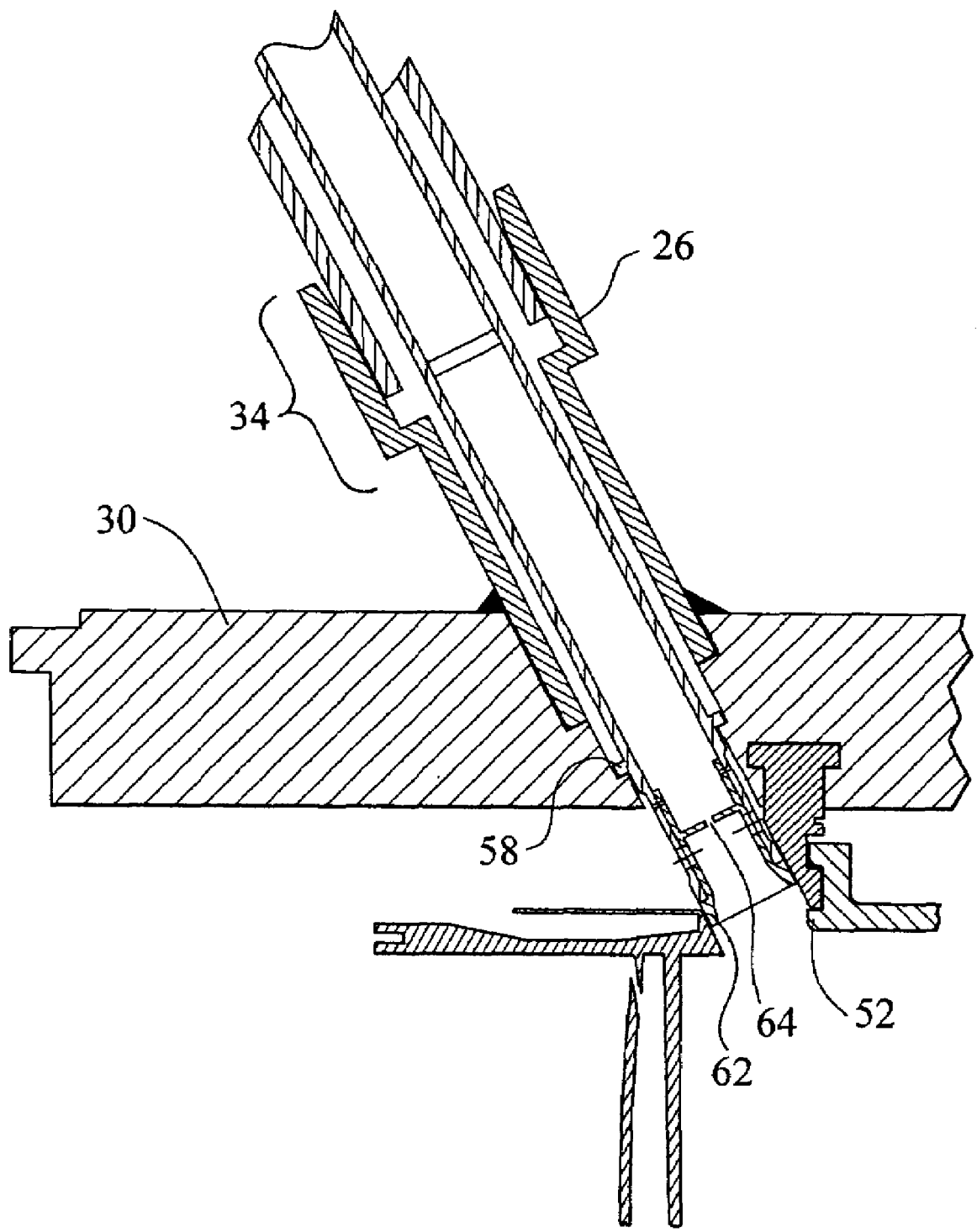
FIG. 3 is a cross-sectional detail view of the inspection system shown in FIG. 2 taken at detail 3—3.

As shown in FIGS. 1–3, this invention is directed to an inspection system 10 for a turbine engine. The inspection system 10 may be formed from a viewing tube 12 enabling turbine components, such as a turbine blade assembly 13, to be viewed while a turbine engine is operating. In at least one embodiment, the inspection system 10 may be used to visually inspect row one turbine blades or other rows in a turbine engine. The inspection system 10 may include a support system 14 including at least one bearing 16 for supporting the viewing tube 12 while enabling the viewing tube 12 to move relative to the turbine engine to protect the viewing tube 12 from destructive forces developed in a turbine engine during operation. The inspection system 10 may also include one or more lenses 18 positioned inside the viewing tube 12 for enhancing the view through the viewing tube 12. The lenses 18 may be exposed to combustion gases during normal turbine engine operation. During operation, the inspection system 10 may have a higher pressure within the viewing tube 12 than is found in a chamber in which an end 20 of the viewing tube is inserted, which may be a combustion chamber, so that contaminants are prevented from entering the viewing tube 12 and negatively affecting the lenses 18.

As shown in FIG. 2, the inspection system 10 may be formed from viewing tube 12 enabling turbine components positioned internally within a turbine engine to be viewed during operation of the turbine engine. The viewing tube 12 may be formed from one or more housings and, in at least one embodiment, as shown in FIG. 2, the viewing tube 12 may be formed from an outer housing 22 and an inner housing 24. The outer housing 22 may be positioned within a turbine engine and attached to a receiver 26 and a support housing 28. The outer housing 22 may have an inner cavity extending through the outer housing 22. In at least one embodiment, the outer housing 22 may be formed from a generally cylindrical tube. However, the outer housing 22 is not limited to this configuration but may have other appropriate shapes as well.

The receiver 26 may be coupled to a component 30 of a turbine engine, which in at least one embodiment is a blade ring. The receiver 26 may be any size or shape necessary to support and receive the outer housing 22. In at least one embodiment, the receiver 26 may be generally cylindrical and include an internal cavity 32 enabling the inner housing 24 to pass through. The receiver 26 may be attached to the blade ring 30 using any appropriate connection mechanism, such as, but not limited to, welding. The receiver 26 may include an outer housing receiving region 34 configured to enable the outer housing 22 to be inserted into the receiver 26 and contained by the receiver 26.

The support housing 28 may be attached to an outer turbine cylinder 36 inline with the receiver 26 enabling an outer housing 22 to extend from the support housing 28 through the receiver 26. The support housing 28 may include a cavity 38 configured to receive the outer housing 22 and the inner housing 24. The support housing 28 may be attached to the outer turbine cylinder 36 using any suitable connection method such as, but not limited to, a weld.

The outer housing 22 may have a bearing 16 attached to an outer surface 42 of the outer housing 22 for positioning the outer housing 22 radially within the outer housing 22 relative to the longitudinal axis 44. The bearing 16 may rest within an indentation 46 in an inner wall 48 the support housing 28 forming a ball and socket connection. In at least one embodiment, as shown in FIG. 2, the bearing 16 may be generally spherical and the indentation 46 may have a semi-torodial shape. The shape of the bearing 16 is not limited to this configuration but may have other appropriate configurations. The outer housing 22 may be positioned axially in the support housing 28 by biasing the outer housing 22 toward the receiver 26. The outer housing 22 may be biased in numerous manners. For example, as shown in FIG. 2, the outer housing 22 may be biased toward the receiver 26 using at least one spring 50.

The inner housing 24 may extend from the support housing 28 through the receiver 26 and into the blade ring 30. The inner housing 24 may have an inner cavity extending through the inner housing 24. In at least one embodiment, the inner housing 24 may be formed from a generally cylindrical tube. However, the inner housing 24 is not limited to this configuration but may have other appropriate shapes as well. In at least one embodiment, the inner housing 24 is prevented from moving along the longitudinal axis 44 and contacting a turbine blade through use of a retention tab 52, as shown in FIG. 3. The retention tab 52 may be positioned on a turbine component proximate to an end of the inner housing 24. The retention tab 52 prevents the inner housing 24 and other viewing tube components from contacting a turbine blade during failure or otherwise. In at least one embodiment, the retention tab 52 extends from a turbine component toward the longitudinal axis a distance sufficient to prevent axial movement of the inner housing 24.

The inner housing 24 may also be biased along the longitudinal axis 44 toward the receiver 26. The inner housing 24 may be biased using any appropriate device. For instance, as shown in FIG. 2, the inner housing 24 may be biased toward the receiver 26 along the longitudinal axis 44 with a spring 54 positioned at the end of the inner housing 24 contained within the support housing 28. The inner housing 24 may be positioned within the outer housing 22 with a ring 56 or other protrusion extending between the inner and outer housings 22, 24 in the support housing 28, and the inner housing 24 may be held within the outer housing 22 at the end 20 with a ring 58 or other protrusion.

The inner housing 24 may include a cap 62 at the end 20. The cap 62 may include at least one aperture 64 enabling the light to pass though the inner housing 24. The size of the aperture 64 may vary based on the application. During operation, a pressure gradient exists between the internal aspects of the inner housing 24 and areas outside the inner housing 24. The aperture 64 allows gases to flow between a higher pressure region contained within the inner housing 24 to areas outside of the inner housing 24 thereby preventing contaminants from entering the inner housing 24 and damaging the lenses contained therein.

In at least one embodiment, the viewing tube 12 may also include one or more optical lenses 18 positioned along the length of the viewing tube 12. The optical lens 18 may be positioned at various positions dependent upon the application. By positioning the lenses 18 in the viewing tube 12, the lenses 18 may be exposed indirectly to high temperatures from combustion gases. The lenses 18 may be contained within an optical lens housing 66. The optical lens housing 66 may be contained within the inner housing 24 enabling light to pass through the aperture 64 and through the lenses 18 to the sensing equipment or to a user at the end of the viewing tube 12 proximate the support housing 28. The optical lens housing 66 may be removed to service or replace the lenses 18. In at least one embodiment, the lenses 18 may be infrared lenses.

The viewing tube 12 may remain in place in a turbine engine while the turbine engine is running and while the turbine engine is at rest. By enabling the viewing tube 12 to remain in position during operation, internal components of the turbine engine may be monitored during operation. During operation, a higher pressure of gases is maintained in the inner housing 24 of the viewing tube 12 than outside of the inner housing 24 of the viewing tube 12. As a result, gases flow out of the aperture 64 and prevent, or at least substantially limit, contaminants from entering the inner housing 24 through aperture 64 and damaging the lenses 18.

The foregoing is provided for purposes of illustrating, explaining, and describing embodiments of this invention. Modifications and adaptations to these embodiments will be apparent to those skilled in the art and may be made without departing from the scope or spirit of this invention.

We claim:

1. An inspection system for a turbine engine, comprising:
   at least one receiver coupled to a component of a turbine engine proximate to a turbine blade assembly;
   at least one cylindrical support housing coupled to an outer surface of an outer turbine cylinder;
   at least one generally elongated outer housing extending at least from the at least one cylindrical support housing coupled to an outer surface of an outer turbine cylinder through the at least one receiver coupled to a component of a turbine engine and biased towards the at least one receiver and towards the turbine blade assembly;
   wherein the outer housing is supported with a substantially spherical bearing that is coupled to an outer surface of the outer housing and bears against an inner surface of the at least one cylindrical support housing to form a seal sealing the outer housing to the at least one cylindrical support housing;
   wherein the inner surface the at least one cylindrical support housing is generally parallel to a longitudinal axis of the outer housing enabling axial movement of the outer housing relative to the at least one cylindrical support housing while maintaining a seal between the outer housing and the at least one cylindrical support housing regardless of axial movement of the outer housing relative to the at least one cylindrical support housing.

2. The inspection system of claim 1, further comprising at least one generally elongated hollow inner housing positioned concentrically within the at least one generally elongated outer housing and including at least one aperture in an end of the generally elongated hollow inner housing.

3. The inspection system of claim 2, wherein the at least one generally elongated inner housing is biased towards the at least one receiver.

4. The inspection system of claim 3, wherein the at least one generally elongated inner housing is biased towards the at least one receiver with a spring contained within the at least one cylindrical support housing.

5. The inspection system of claim 1, wherein the at least one generally elongated outer housing is biased towards the at least one receiver with a spring contained within the at least one cylindrical support housing.

6. The inspection system of claim 1, wherein the bearing is seated within a semi-toroidal indentation in the inner surface of the at least one cylindrical support housing.

7. The inspection system of claim 1, further comprising at least one optics lens in internal aspects of the at least one outer housing.

8. The inspection system of claim 7, wherein the at least one optics lens comprises at least one infrared lens.

9. The inspection system of claim 7, further comprising an optical lens housing positioned within the inner housing and containing at least one optics lens.

10. The inspection system of claim 1, further comprising a pressure gradient in which a higher pressure exists within the at least one generally elongated outer housing than outside the at least one generally elongated outer housing proximate to the at least one receiver.

11. The inspection system of claim 1, wherein the component of the turbine engine that at least one receiver is coupled to is a blade ring.

12. The inspection system of claim 1, further comprising an outer housing retention tab positioned proximate to an end of the at least one outer housing proximate the at least one receiver for preventing the at least one outer housing from moving into contact with a turbine blade.

13. The inspection system of claim 12, wherein the outer housing retention tab extends from a ring segment.

14. An inspection system for a turbine engine, comprising:
   at least one receiver coupled to a component of a turbine engine proximate to a turbine blade assembly;
   at least one cylindrical support housing coupled to an outer surface of an outer turbine cylinder;
   at least one generally elongated outer housing extending at least from the at least one cylindrical support housing coupled to an outer surface of an outer turbine cylinder through the at least one receiver coupled to a component of the turbine engine and biased towards the at least one receiver and towards the turbine blade assembly;
   at least one generally elongated inner housing positioned concentrically with the at least one generally elongated outer housing and including at least one aperture in an end of the generally elongated inner housing with a diameter less than a diameter of the inner housing;
   an outer housing retention tab positioned proximate to an end of the at least one outer housing proximate the at least one receiver for preventing the at least one outer housing from moving into contact with a turbine blade by moving axially along a longitudinal axis of the outer housing relative to the at least one receiver; and
   wherein a pressure gradient exists in which a higher pressure exists within the at least one generally elongated outer housing than outside the at least one generally elongated outer housing proximate to the at least one receiver.

15. The inspection system of claim 14, wherein the outer housing is supported with a substantially spherical bearing that is coupled to an outer surface of the outer housing and bears against an inner surface of the at least one cylindrical support housing to form a seal the outer housing to the at least one cylindrical support housing, wherein the inner surface the at least one cylindrical support housing is generally parallel to a longitudinal axis of the outer housing enabling axial movement of the outer housing relative to the at least one cylindrical support housing while maintaining a seal between the outer housing and the at least one cylindrical support housing regardless of axial movement of the outer housing relative to the at least one cylindrical support housing.

16. The inspection system of claim 15, wherein the bearing is seated within a semi-toroidal indentation in the inner surface of the at least one cylindrical support housing.

17. The inspection system of claim 14, further comprising an optical lens housing positioned within the inner housing and at least one optics lens in the optical lens housing.

18. An inspection system for a turbine engine, comprising:
   at least one receiver coupled to a component of a turbine engine proximate to a turbine blade assembly;
   at least one cylindrical support housing coupled to an outer surface of an outer turbine cylinder;
   at least one generally elongated outer housing extending at least from the at least one cylindrical support housing coupled to an outer surface of an outer turbine cylinder through the at least one receiver coupled to a component of the turbine engine wherein the at least one generally elongated outer housing is exposed to combustor gases and wherein the at least one generally elongated outer housing is biased towards the at least one receiver and towards the turbine blade assembly;
   at least one optics lens positioned in an optical lens housing in the at least one outer housing;
   a pressure gradient in which a higher pressure exists within the at least one generally elongated outer housing than outside the at least one generally elongated outer housing proximate to the at least one receiver;
   wherein the outer housing is supported with a substantially spherical bearing that is coupled to an outer surface of the outer housing and bears against an inner surface of the at least one cylindrical support housing to form a seal sealing the outer housing to the at least one cylindrical support housing; and
   wherein the inner surface the at least one cylindrical support housing is generally parallel to a longitudinal axis of the outer housing enabling axial movement of the outer housing relative to the at least one cylindrical support housing while maintaining a seal between the outer housing and the at least one cylindrical support housing regardless of axial movement of the outer housing relative to the at least one cylindrical support housing.

19. The inspection system of claim 18, wherein the at least one optics lens comprises at least one infrared lens.

* * * * *